US009903289B2

(12) United States Patent
Zielinski et al.

(10) Patent No.: US 9,903,289 B2
(45) Date of Patent: Feb. 27, 2018

(54) METHOD AND SYSTEMS FOR EGR CONTROL

(71) Applicant: General Electric Company, Schenectady, NY (US)

(72) Inventors: David Zielinski, Erie, PA (US); Luke Michael Henry, Erie, PA (US)

(73) Assignee: General Electric Company, Schenectady, NY (US)

( * ) Notice: Subject to any disclaimer, the term of this patent is extended or adjusted under 35 U.S.C. 154(b) by 659 days.

(21) Appl. No.: 14/479,970

(22) Filed: Sep. 8, 2014

(65) Prior Publication Data

US 2016/0069286 A1 Mar. 10, 2016

(51) Int. Cl.
| | |
|---|---|
| *F02D 41/00* | (2006.01) |
| *F02D 41/10* | (2006.01) |
| *F02D 41/30* | (2006.01) |
| *F02M 26/43* | (2016.01) |
| *F02D 43/00* | (2006.01) |
| *F02M 26/05* | (2016.01) |

(52) U.S. Cl.
CPC ..... *F02D 41/0082* (2013.01); *F02D 41/0002* (2013.01); *F02D 41/0077* (2013.01); *F02D 41/10* (2013.01); *F02D 41/30* (2013.01); *F02D 43/00* (2013.01); *F02M 26/43* (2016.02); *F02D 2041/0017* (2013.01); *F02M 26/05* (2016.02); *Y02T 10/47* (2013.01)

(58) Field of Classification Search
CPC ....... F02M 26/43; F02B 47/08; F02D 41/005; F02D 41/0052; F02D 41/0082; F02D 41/1454

See application file for complete search history.

(56) References Cited

U.S. PATENT DOCUMENTS

| | | | |
|---|---|---|---|
| 6,286,489 B1 | 9/2001 | Bailey | |
| 6,789,531 B1 | 9/2004 | Remmels | |
| 2012/0078492 A1 | 3/2012 | Freund et al. | |
| 2013/0030672 A1* | 1/2013 | Klingbeil | F02D 41/0085 701/109 |

(Continued)

FOREIGN PATENT DOCUMENTS

| | | |
|---|---|---|
| EP | 1460251 A2 | 9/2004 |
| WO | 2014005127 A2 | 1/2014 |

OTHER PUBLICATIONS

European Search Report and Opinion issued in connection with corresponding EP Application No. 15184085.7 dated Jan. 29, 2016.

*Primary Examiner* — Joseph Dallo
*Assistant Examiner* — Anthony L Bacon
(74) *Attorney, Agent, or Firm* — GE Global Patent Operation; John A. Kramer (57) ABSTRACT

Various methods and systems are provided for controlling exhaust gas recirculation in an engine. One embodiment for a system comprises an engine having first and second cylinder groups, and an exhaust gas recirculation (EGR) passage coupled between the first cylinder group and an intake manifold of the engine, flow of EGR through the EGR passage controlled by one or more EGR exhaust valves, and a controller configured to maintain a target intake gas concentration by adjusting the one or more EGR exhaust valves and adjusting fuel injection amounts to the first cylinder group differently than the second cylinder group.

21 Claims, 6 Drawing Sheets

(56) References Cited

U.S. PATENT DOCUMENTS

| | | | | |
|---|---|---|---|---|
| 2014/0047834 A1* | 2/2014 | Polkus | .................... | F02D 23/00 |
| | | | | 60/602 |
| 2014/0067236 A1* | 3/2014 | Henry | ................. | F02D 41/1446 |
| | | | | 701/104 |
| 2015/0369180 A1* | 12/2015 | Leone | ................. | F02N 11/0803 |
| | | | | 123/52.1 |
| 2016/0053729 A1* | 2/2016 | Geckler | ............. | F02M 25/0706 |
| | | | | 123/445 |

* cited by examiner

METHOD AND SYSTEMS FOR EGR CONTROL

BACKGROUND

Technical Field

Embodiments of the subject matter disclosed herein relate to exhaust gas recirculation (EGR) systems and methods.

Discussion of Art

Some engines utilize recirculation of exhaust gas from an engine exhaust system to an engine intake system, a process referred to as exhaust gas recirculation (EGR), to reduce combustion temperatures and regulated emissions. In some examples, a first group of one or more cylinders provides exhaust gas that is directed through an EGR passage coupled between the first group of cylinders and an intake manifold to provide EGR while a second group of one or more cylinders provides substantially no exhaust gas to the EGR passage. In such a configuration, EGR rate is typically controlled through operation of a valve that is located in the EGR passage. The valve position is controlled to vary a mass flow rate of EGR provided to the intake manifold. However, a relatively large amount of latency exists in the EGR system, making it difficult to deliver a desired amount of EGR during changing engine operating conditions.

BRIEF DESCRIPTION

In one embodiment, a system comprises an engine having a first cylinder group and a second cylinder group, an exhaust gas recirculation (EGR) passage coupled between the first cylinder group and an intake manifold, flow of EGR through the EGR passage controlled by one or more exhaust valves, an exhaust passage coupled to the second cylinder group, and a controller. The controller is configured to maintain a target intake gas concentration by adjusting the one or more exhaust valves and adjusting fuel injection amounts to the first cylinder group differently than the second cylinder group.

DETAILED DESCRIPTION

The following description relates to embodiments for a system for maintaining intake gas concentration. In one example, the system includes an engine having a first cylinder group and a second cylinder group. The engine may be installed in a vehicle, such as a rail vehicle, marine vehicle, or other on- or off-highway vehicle, or the engine may be installed in another semi-mobile or stationary platform. The system may include an EGR passage coupled between the first cylinder group and an intake manifold of the engine and an exhaust passage coupled to the second cylinder group, with flow of EGR through the EGR passage controlled by one or more exhaust valves. As such, the first cylinder group may be referred to as a donor cylinder group, where only the exhaust from the first cylinder group, and not the exhaust from the second cylinder group, is provided to the intake manifold as EGR. The system further includes a controller configured to maintain a target intake gas concentration by adjusting the one or more exhaust valves and adjusting fuel injection amounts to the first cylinder group differently than the second cylinder group. The target intake gas concentration may be an oxygen concentration in one example. In other examples, the target intake gas concentration may be a different gas component of the intake air flowing to the cylinders that may be indicative of an EGR amount, such as carbon dioxide concentration. The target intake oxygen concentration may be based on engine speed and torque load, for example, and the exhaust valve(s) may be opened or closed to bring the intake oxygen concentration to the target intake oxygen concentration. In an example, the target oxygen concentration may be an intake oxygen concentration below which undesired emissions are produced, for example.

Figure 1:
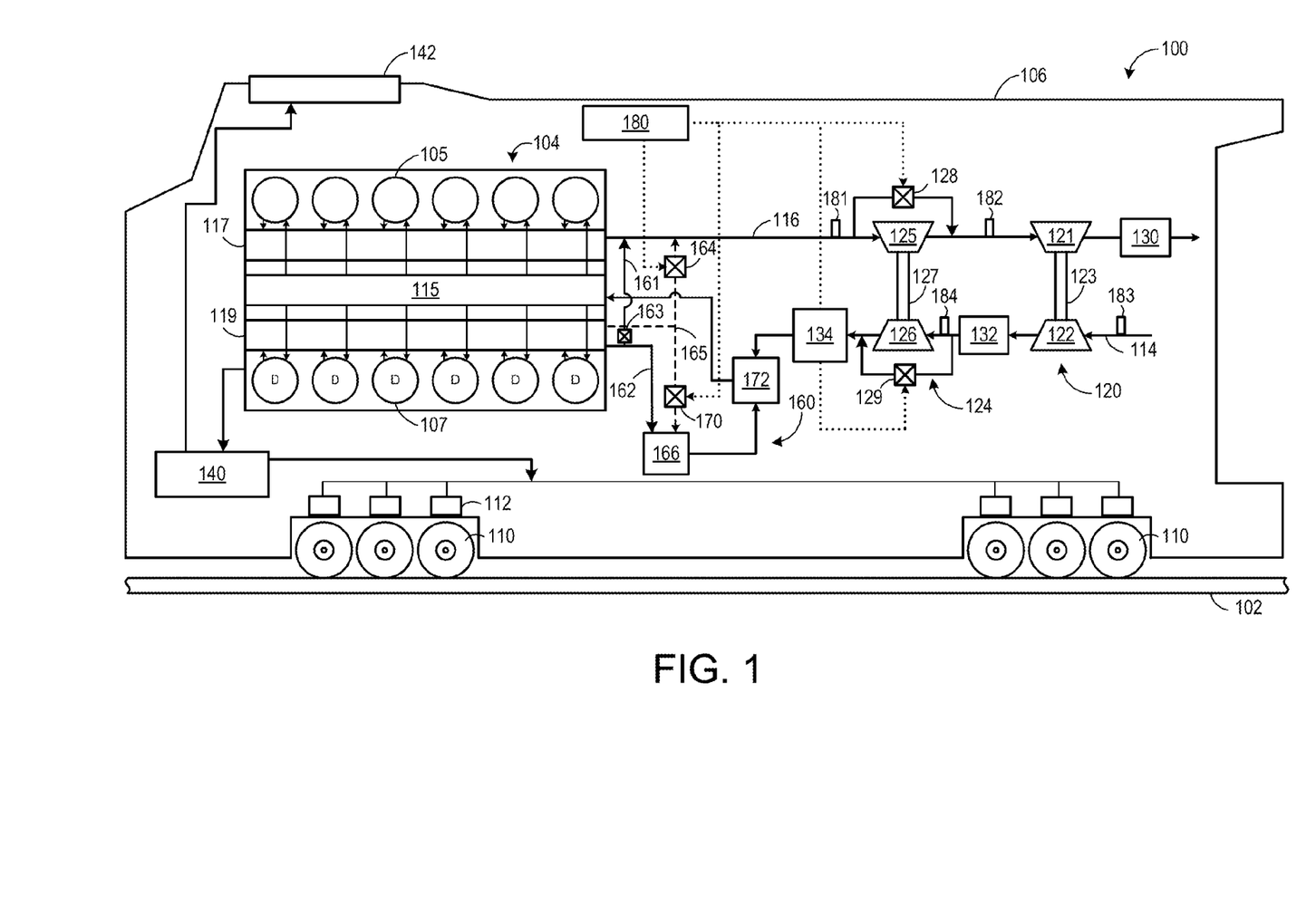
FIG. 1 shows a schematic diagram of a rail vehicle according to an embodiment of the present disclosure.
Figure 2:
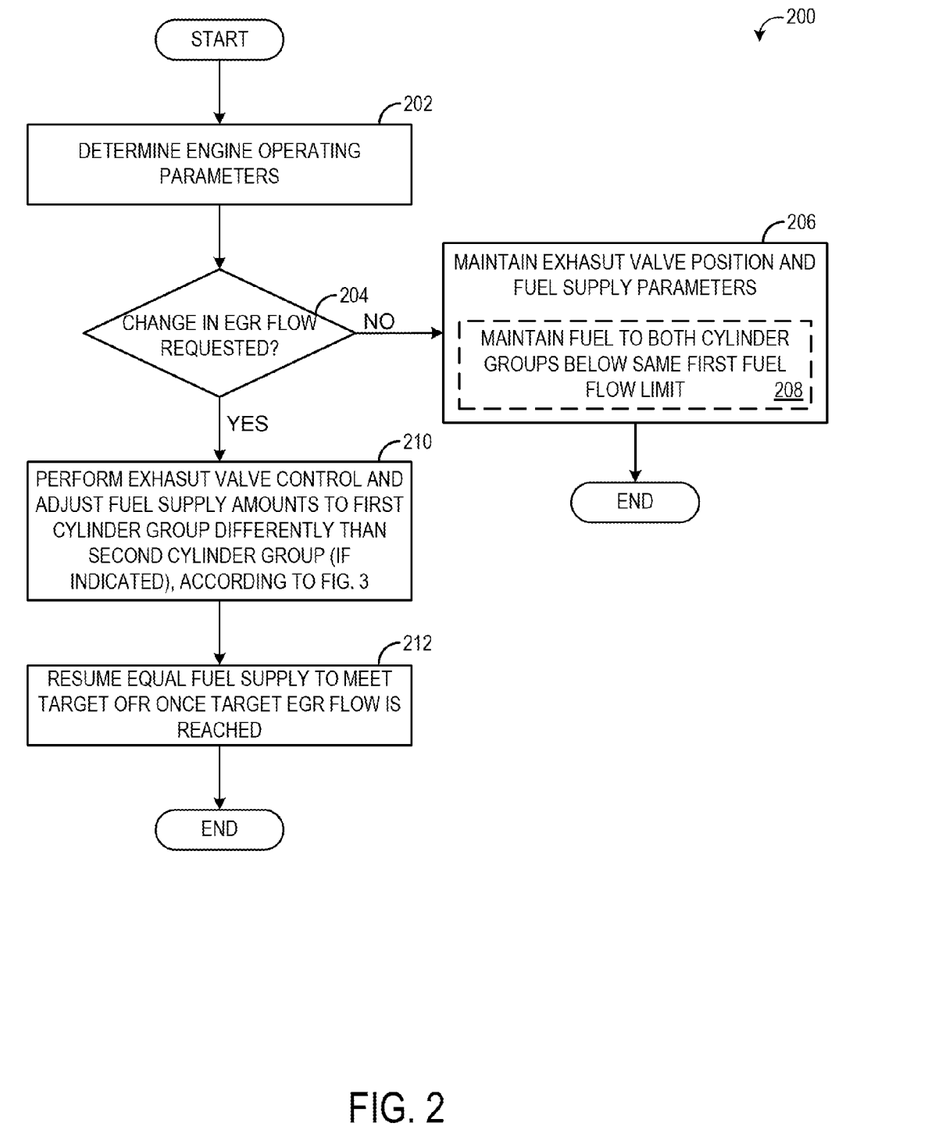
FIG. 2 is a flow chart illustrating a method for controlling EGR.
Figure 3:
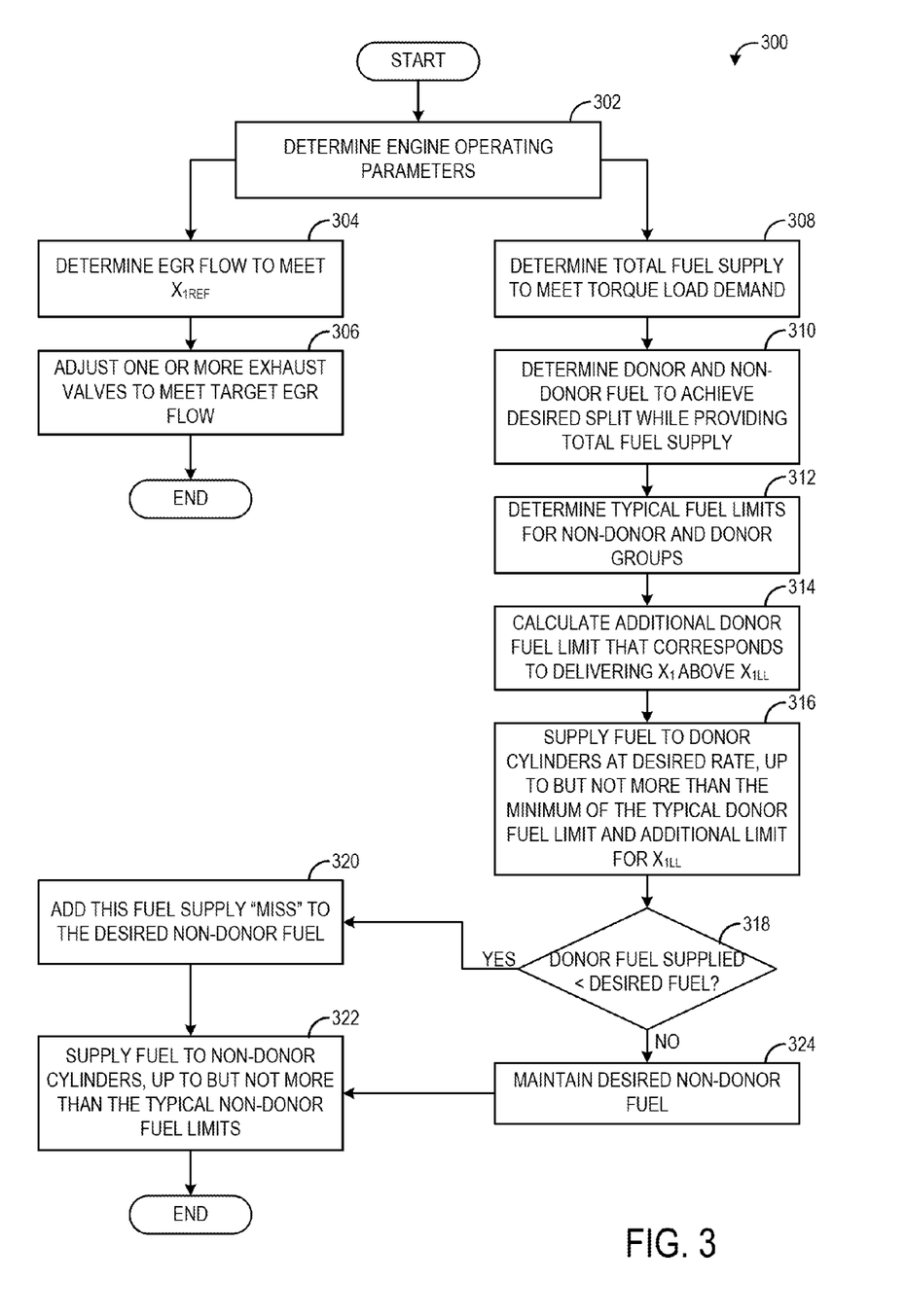
FIG. 3 is a flow chart illustrating a method for adjusting fuel flow.
Figure 4:
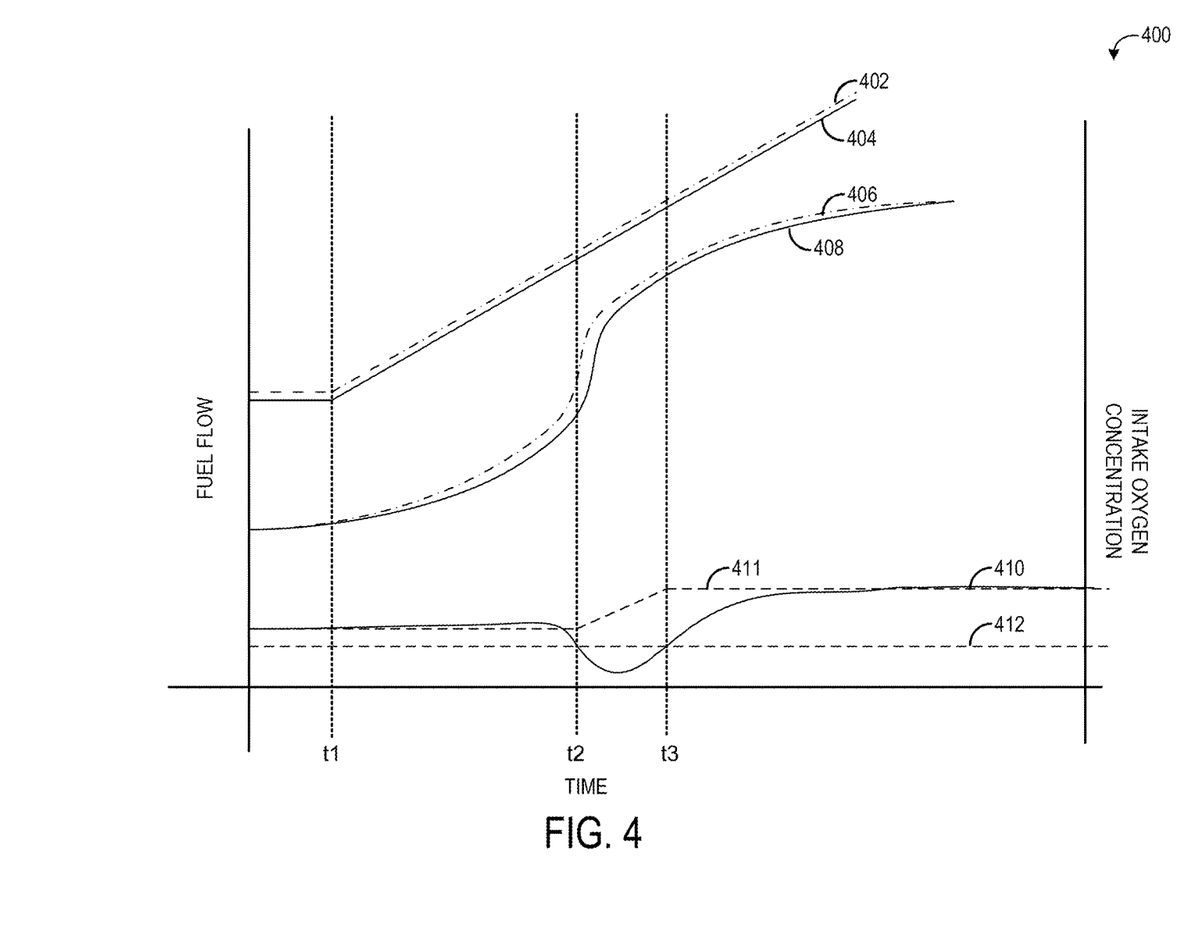
FIGS. 4-6 are example engine operating plots.
Figure 5:
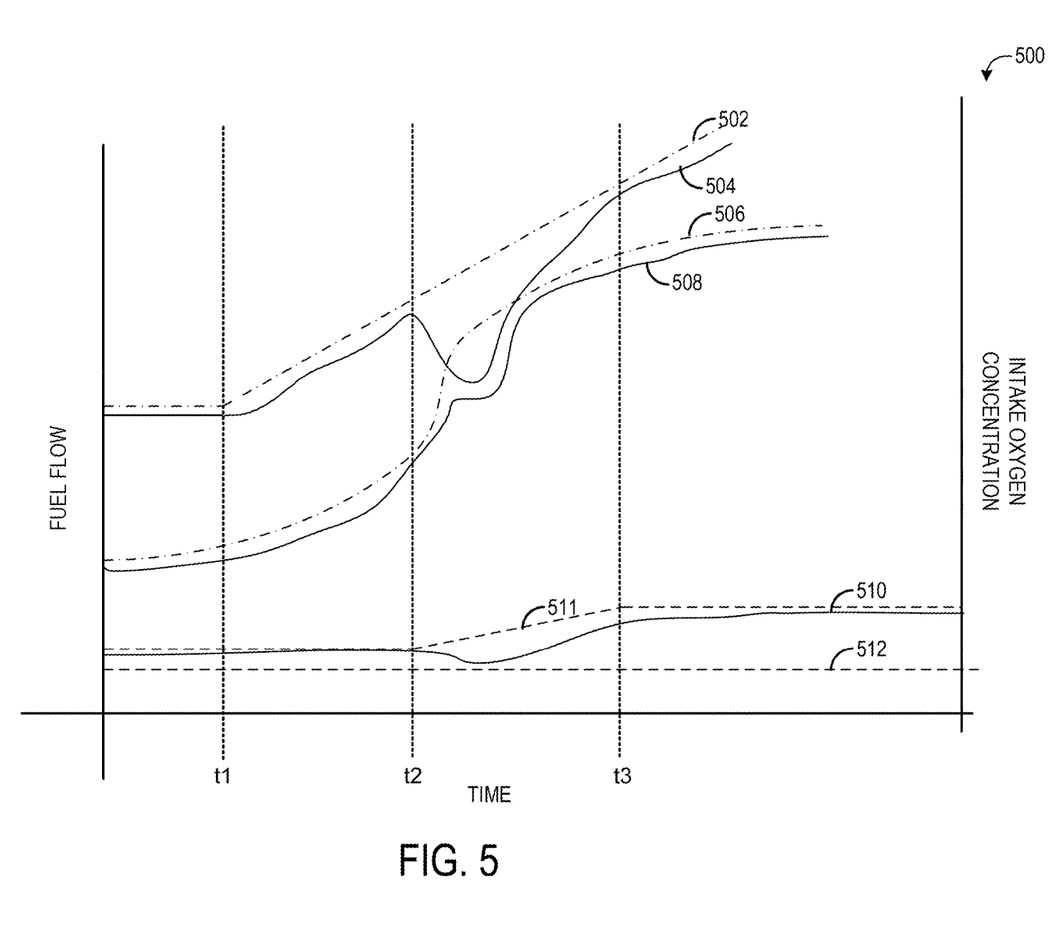
Figure 6:
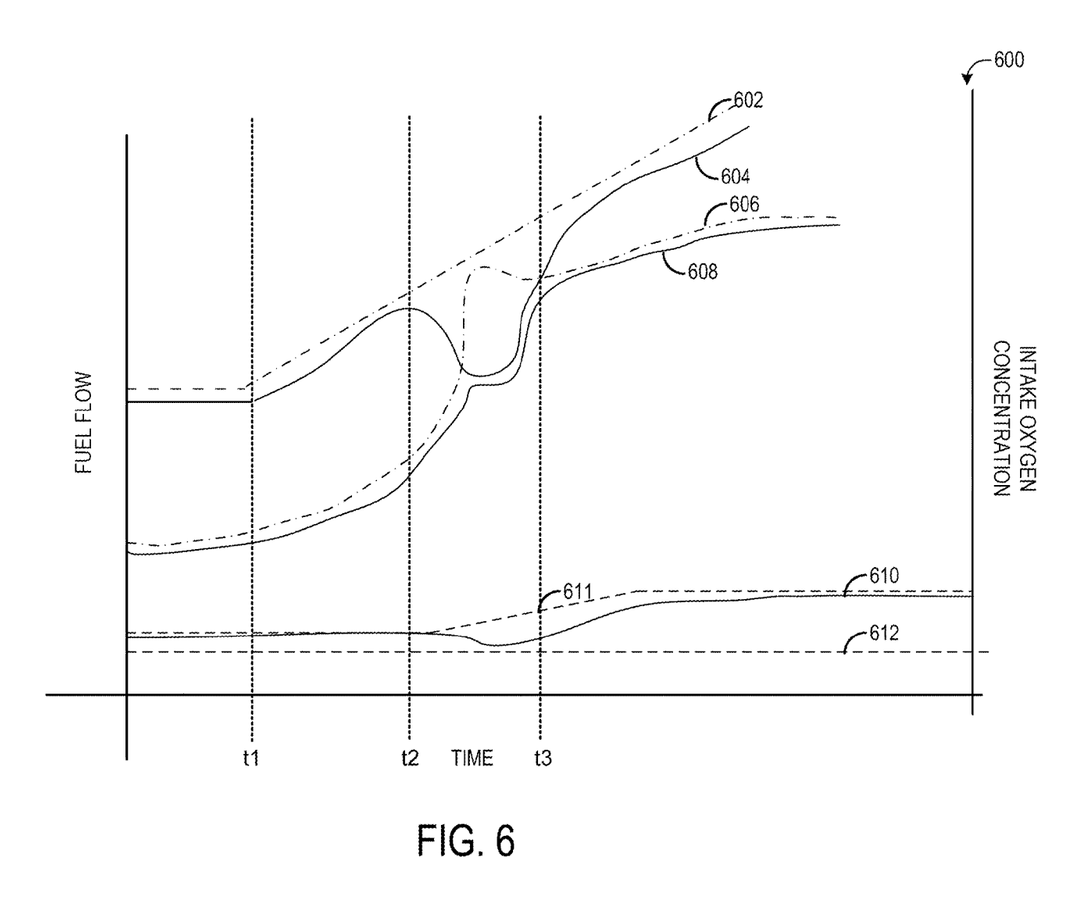

An example system including an engine having a first cylinder group and a second cylinder group, and an EGR passage coupled between the first cylinder group and an intake manifold of the engine is shown in FIG. 1. FIG. 1 also includes a controller configured to carry out the methods illustrated in FIGS. 2-3. Example operational plots of fuel flow and intake oxygen concentrations during the execution of the methods of FIGS. 2-3 are illustrated in FIGS. 4-6.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for regulating intake oxygen concentration, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above.

The engine receives intake air for combustion from an intake, such as an intake manifold 115. The intake may be any suitable conduit or conduits through which gases flow to enter the engine. For example, the intake may include the intake manifold, the intake passage 114, and the like. The intake passage receives ambient air from an air filter (not shown) that filters air from outside of a vehicle in which the engine may be positioned. Exhaust gas resulting from combustion in the engine is supplied to an exhaust, such as exhaust passage 116. The exhaust may be any suitable conduit through which gases flow from the engine. For example, the exhaust may include an exhaust manifold 117, the exhaust passage, and the like. Exhaust gas flows through the exhaust passage, and out of an exhaust stack of the rail vehicle.

In one example, the engine is a diesel engine that combusts air and diesel fuel through compression ignition. As such, the engine may include a plurality of fuel injectors to inject fuel to each cylinder of the engine. For example, each cylinder may include a direct injector that receives fuel from a high-pressure fuel rail. In other non-limiting embodiments, the engine may combust fuel including gasoline, kerosene, biodiesel, or other petroleum distillates of similar density through compression ignition (and/or spark ignition). In a still further example, the engine may combust gaseous fuel, such as natural gas. The gaseous fuel may be ignited via compression ignition of injected diesel fuel, herein referred to as multi-fuel operation, or the gaseous fuel may be ignited via spark ignition. The gaseous fuel may be supplied to the cylinders via one or more gas admission valves, for example. In further examples, the fuel may be supplied to the cylinders via port injection. The liquid fuel (e.g., diesel) may be stored in a fuel tank located on board the rail vehicle. The gaseous fuel may be stored in a storage tank located on board the rail vehicle or on board a different vehicle operably coupled to the rail vehicle.

In one embodiment, the rail vehicle is a diesel-electric vehicle (or diesel/gaseous fuel-electric hybrid). As depicted in FIG. 1, the engine is coupled to an electric power generation system, which includes an alternator/generator 140 and electric traction motors 112. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of a plurality of wheels 110 to provide tractive power to propel the rail vehicle. One example configuration includes one traction motor per wheel. As depicted herein, six traction motors correspond to each of six pairs of wheels of the rail vehicle. In another example, alternator/generator may be coupled to one or more resistive grids 142. The resistive grids may be configured to dissipate excess engine torque via heat produced by the grids from electricity generated by alternator/generator.

In the embodiment depicted in FIG. 1, the engine is a V-12 engine having twelve cylinders. In other examples, the engine may be a V-6, V-8, V-10, V-16, I-4, I-6, I-8, opposed 4, or another engine type. As depicted, the engine includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders are coupled to the exhaust passage to route exhaust gas from the engine to atmosphere (after it passes through an exhaust gas treatment system 130 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., $NO_x$).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, in some embodiments, the EGR system may include an EGR bypass passage 161 that is configured to divert exhaust from the donor cylinders back to the exhaust passage. The EGR bypass passage may be controlled via a valve 163. The valve may be configured with a plurality of restriction points such that a variable amount of exhaust is routed to the exhaust, in order to provide a variable amount of EGR to the intake.

In an alternate embodiment shown in FIG. 1, the donor cylinders may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler and/or additional elements prior to being routed to the intake passage. Further, the alternate EGR system includes a first valve 164 disposed between the exhaust passage and the alternate EGR passage.

The first valve and second valve may be on/off valves controlled by the control unit 180 (for turning the flow of EGR on or off), or they may control a variable amount of EGR, for example. In some examples, the first valve may be actuated such that an EGR amount is reduced (exhaust gas flows from the EGR passage to the exhaust passage). In other examples, the first valve may be actuated such that the EGR amount is increased (e.g., exhaust gas flows from the exhaust passage to the EGR passage). In some embodiments, the alternate EGR system may include a plurality of EGR valves or other flow control elements to control the amount of EGR.

In such a configuration, the first valve is operable to route exhaust from the donor cylinders to the exhaust passage of the engine and the second valve is operable to route exhaust from the donor cylinders to the intake passage of the engine. As such, the first valve may be referred to as an EGR bypass valve, while the second valve may be referred to as an EGR metering valve. In the embodiment shown in FIG. 1, the first valve and the second valve may be engine oil, or hydraulically, actuated valves, for example, with a shuttle valve (not shown) to modulate the engine oil. In some examples, the valves may be actuated such that one of the first and second valves are normally open and the other is normally closed.

In other examples, the first and second valves may be pneumatic valves, electric valves, or another suitable valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of turbochargers 120 and 124 in the exhaust passage to a location downstream of the turbochargers in the intake passage. In other embodiments, the vehicle system may additionally or alternatively include a low-pressure EGR system which routes exhaust gas from downstream of the turbochargers in the exhaust passage to a location upstream of the turbochargers in the intake passage.

As depicted in FIG. 1, the vehicle system further includes a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to the "low-pressure stage" of the turbocharger. The second turbocharger operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger is provided with a turbine bypass valve 128 which allows exhaust gas to bypass the second turbocharger. The turbine bypass valve may be opened, for example, to divert the exhaust gas flow away from the second turbine. In this manner, the rotating speed of the compressor, and thus the boost provided by the turbochargers to the engine may be regulated during steady state conditions. Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor to avoid compressor surge, for example. In some embodiments, first turbocharger may also be provided with a compressor bypass valve, while in other embodiments, only first turbocharger may be provided with a compressor bypass valve.

The vehicle system 100 further includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The vehicle system further includes the control unit 180 (also referred to as a controller), which is provided and configured to control various components related to the vehicle system. In one example, the control unit includes a computer control system. The control unit further includes non-transitory, computer readable storage media (not shown) including code for enabling on-board monitoring and control of engine operation. The control unit, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, exhaust temperature, exhaust pressure, etc. Correspondingly, the control unit may control the vehicle system by sending commands to various components such as fraction motors, alternator, cylinder valves, throttle, heat exchangers, wastegates or other valves or flow control elements, etc.

As explained above, the vehicle system includes a donor EGR system where a first group of cylinders (the donor cylinders) is coupled to both the EGR passage and the exhaust passage, and a second group of cylinders (the non-donor cylinders) is coupled exclusively to the exhaust passage (e.g., the second cylinder group provides substantially no exhaust to the intake). During engine operation, a target intake oxygen concentration is maintained by controlling the amount of exhaust that is recirculated back to the intake from the donor cylinders. Thus, to increase the intake oxygen concentration, the amount of EGR is reduced (e.g., the EGR valve controlling flow of exhaust from the donor cylinders through the EGR passage is moved to a more closed position), while to decrease the intake oxygen concentration, the amount of EGR is increased (e.g. the EGR valve controlling flow of exhaust from the donor cylinders through the EGR passage is moved to a more open position). During steady state conditions, where engine speed and torque load do not change, the target intake oxygen concentration also tends to remain constant, and thus the EGR amount typically does not change by a large amount. However, if a torque load change is requested (and thus the engine enters a transient operating condition), one or more exhaust valves that control flow of EGR from the donor cylinders to the intake may be adjusted to either meet a new target intake oxygen concentration, or to compensate for the changing intake air flow resulting from the change in load.

During the initial response to the transient operating condition, the change in EGR amount provided to the intake may not be instantaneous. Rather, due to latency the EGR system arising from delays in valve actuation and the time it takes to recirculate the exhaust already existing in the EGR passage, a delay occurs from the time the torque load change is requested to when the new amount of requested EGR is actually delivered. Thus, during at least part of the transient operating condition, either more or less EGR may be present in the intake than desired, leading to degraded emissions. Further, while the EGR system experiences a latency as described above, the fueling system does not have such a latency, and thus responds relatively quickly to the torque load request. When an increase in torque load is requested, the fuel amount provided to the cylinders of the engine (both donor and non-donor) may increase, creating exhaust gas with even less oxygen content. Such a decrease in exhaust gas oxygen concentration through the EGR system, in combination with the delay in the EGR system response, may lead to undershoots in the intake oxygen concentration, further degrading emissions.

In an example, the controller is configured to maintain a target intake oxygen concentration by adjusting one or more exhaust valves, and, if needed in order to prevent an intake oxygen concentration undershoot, the controller is further configured to adjust fuel injection amounts to the first cylinder group of the engine differently than the second cylinder group of the engine. The one or more exhaust valves may be suitable valves that control flow of EGR through the EGR passage, such as one or more EGR valves (e.g., valves 163, 164, and/or 170), the turbine bypass valve, etc. An example operating event where dual exhaust valve and fuel supply control is used to maintain desired intake oxygen concentration may include a transient operating condition (e.g., when the operator requests an increase in torque load, for example when the vehicle starts to move from idle).

In this way, while the one or more exhaust valves are commanded to a new position in response to the transient engine event, for example, the amount of fuel provided to the first cylinder group may be adjusted differently than the amount of fuel provided to the second cylinder group. For example, the amount of fuel supplied to the first cylinder group may be decreased relative to the amount of fuel supplied to the second cylinder group. By reducing the amount of fuel supplied to the first cylinder group (e.g., the donor cylinders), more oxygen is present in the exhaust of the donor cylinders, resulting in less effective EGR being provided to the intake and preventing an intake oxygen concentration undershoot.

Turning now to FIG. 2, a method 200 for controlling EGR in an engine system having a donor cylinder EGR system (such as vehicle system 100 of FIG. 1) is presented. Method 200 may be carried out by a controller (e.g., control system 180 of FIG. 1) according to non-transitory instructions stored thereon.

At 202, method 200 includes determining engine operating parameters. The engine operating parameters determined may include, but are not limited to, engine speed, engine torque load, engine throttle position, intake oxygen concentration, operator-requested torque load, and other parameters. Based on the determined operating parameters, at 204, method 200 includes determining if a change in EGR flow has been requested. The change in requested EGR flow may result from a change in a target intake oxygen concentration and/or from a change in intake air flow. In some examples, the change in EGR flow may be requested in response to an indication that the engine is entering into or operating in a transient operating condition. The transient operating condition may include a change in torque load, requested by an operator, for example. In one example, the torque load may be based on throttle position, where the operator may adjust the throttle position to change the torque load (and hence adjust the vehicle speed). The throttle may include one or more discrete positions (such as a notch throttle) or may be a continuously variable position throttle having a near infinite number of throttle positions.

If a change in EGR flow is not requested (e.g., if the engine is operating under steady state operating conditions), method 200 proceeds to 206 to maintain exhaust valve position and fuel supply parameters. The one or more exhaust valves may include valves that directly impact EGR flow (such as valves 163, 164, and/or 170) as well as valves that affect EGR flow by changing the exhaust backpressure or intake manifold pressure, such as a turbine bypass valve. The fuel supply parameters may include providing fuel to the first and second cylinder groups according to a first predetermined relationship in order to maintain requested engine torque load. The predetermined relationship may include providing fuel similarly to the first cylinder group and second cylinder group in some examples. As used herein, providing fuel similarly may include providing fuel equally, such that both cylinder groups receive an equal amount of fuel. Providing fuel similarly may include providing fuel to both the first and second cylinder group at or below the same fuel flow limit, as explained below. Further, providing fuel similarly may include providing fuel in equal or different amounts between to the two cylinder groups, but making the fuel flow adjustments to both cylinder groups (e.g., if an increase in fuel flow is commanded, both the first and second cylinder groups receive an increase in fuel flow). The predetermined relationship may result in fuel being provided unequally to the first vs. second cylinder group, for example to account for differing exhaust pressure between the cylinder groups, different injection timing and other injection characteristics, actual hardware differences in the power assembly and ports, etc. Providing fuel to the first and second cylinder groups according to a predetermined relationship may include, as indicated at 208, maintaining fuel flow to both cylinder groups below the same first fuel flow limit. The first fuel flow limit may be based on suitable operating parameters, such as engine torque load, peak cylinder pressure limit, intake air flow, and/or other suitable parameters, in order to prevent degraded emissions resulting from over-fueling and maintain each cylinder within predetermined pressure and/or temperature limits. Additional information about calculating and meeting fuel flow limits will be presented below with respect to FIG. 3.

While during typical steady state conditions, where EGR flow does not change, the fuel limit for the donor and non-donor cylinders may be the same, in some conditions the fuel limits for the donor cylinders and non-donor cylinders may be different. For example, the donor and non-donor cylinders may kept at or below the same "static" fuel limit (e.g., the torque limit described above), while being kept at or below different fuel limits for limiting smoke production (by maintaining a minimum air-fuel ratio, for example), reducing cylinder wall wetting, and/or limiting fuel injector energization times, as the different cylinder groups respond differently to changes in air-fuel ratio, injection parameters, etc.

In this way, during at least some operating conditions, any adjustments to the amount of fuel provided to the engine may be made to both the first and second cylinder groups equally, and both cylinder groups may be provided fuel in amounts that maintain fuel flow to both cylinder groups below the same fuel flow limit. As used herein, providing fuel to the first and second cylinder groups equally may not necessarily always include providing fuel at the same amount to the first and second cylinder groups. Because the first cylinder group is a donor cylinder group, the exhaust pressure on the first cylinder group may be different (e.g., higher) than the exhaust pressure of the second cylinder group, and thus the amount of fuel provided to the first cylinder group may be slightly different than the amount of fuel provided to the second cylinder group. However, when fuel is provided equally to the first and second cylinder groups, the OFR for each cylinder group may be the same, as well as the fuel flow limit. Further, any fuel adjustments may be made to both cylinder groups equally.

Returning to 204 of method 200, if a change in EGR flow has been requested, method 200 proceeds to 210 to perform an exhaust valve control, in order to meet the requested EGR flow change. Further, if indicated, while performing the exhaust valve control, fuel supply amounts to the first cylinder group may be adjusted differently than fuel supply amounts to the second cylinder group, according to the method described below with respect to FIG. 3. Briefly, the fuel flow limit for the first cylinder group may be lowered and the amount of fuel provided to the first cylinder group decreased to increase the oxygen concentration of the exhaust gas produced by the first cylinder group, and hence decrease the amount of EGR provided to the intake of the engine.

After the one or more exhaust valves have been adjusted such that the new target EGR amount is delivered to the intake, the differential adjustment of the fuel supply between the first and second cylinder groups may be stopped, as the EGR system is now capable of delivering the target EGR amount. Thus, at 212, method 200 includes resuming the equal fuel supply to the first and second cylinder groups to meet the requested torque once the requested change in EGR flow is met. Method 200 then returns.

As explained above, during certain conditions, such as entry into a transient operating condition (e.g., once a transient condition is detected) or when intake oxygen concentration drops below a threshold, the control of the fuel supply may be performed differently for the first, donor cylinder group than for the second, non-donor cylinder group. FIG. 3 illustrates a method 300 for differentially controlling fuel supply to maintain a lower limit intake oxygen concentration ($X_{1LL}$). Method 300 may be carried out by a controller according to instructions stored thereon, and may be executed as part of method 200, for example in response to a change in EGR flow, as described above.

At 302, method 300 includes determining engine operating conditions, including but not limited to requested EGR flow change, current exhaust valve position(s), fresh intake air flow, intake air mass, and other parameters. Method 300 includes two parallel branches that are performed simultaneously in response to a requested change in EGR flow, a first branch for control exhaust valve position, and a second branch for controlling fuel supply to the first cylinder group (referred to herein as the donor cylinders) and the second cylinder group (referred to herein as the non-donor cylinder group).

Referring first to the first, exhaust valve control branch, at 304 method 300 includes determining an EGR flow to meet a target intake oxygen concentration ($X_{1REF}$). At 306, one or more exhaust valves are adjusted to the target EGR flow calculated at 304. As explained previously, during a transient event or other operating condition, intake mass air flow, target OFR, and/or other operating parameters may change, in response to the change in torque load for example. In some examples, this may include a new target intake oxygen concentration. In other examples, the target intake oxygen concentration may remain the same, but the parameters affecting the intake oxygen concentration (such as intake mass air flow) may change. As a result, a change in EGR flow provided to the intake may be requested. To meet the new EGR amount request, the one or more EGR valves may be adjusted.

However, a delay may occur between the requested change in EGR flow and when the updated EGR amount is actually delivered to the engine. To compensate for this latency and prevent any intake oxygen concentration undershoots, the amount of fuel provided to the first, donor cylinder group may be adjusted differently than the amount of fuel provided to the second, non-donor cylinder group, as described below with respect to the second branch of method 300. The second branch may be performed simultaneously with the first branch. Further, in some conditions, the second branch may be performed in the absence of an EGR flow change (e.g., in the absence of the first branch being performed), in order to maintain the intake oxygen concentration above a lower limit.

At 308, method 300 includes determining a total fuel supply to meet the torque load demand. At 310, donor and non-donor fuel parameters are determined to achieve a desired split between the two cylinder groups while providing the total fuel supply. The fuel parameters may include fuel supply amounts, as well as injection timing, injection pressure, or other fuel parameters. The desired split between the donor and non-donor cylinders may be based on suitable factors, such as exhaust pressure, per-cylinder or per-cylinder group air-fuel ratio targets, or other factors.

At 312, typical fuel limits for the non-donor and donor cylinder groups are determined. The typical fuel limits may include the first fuel limit, as explained above with respect to FIG. 2. The typical fuel limits (e.g., first fuel flow limit) may include a static fuel limit based on engine torque, which may be applied equally to both cylinder groups, as well as fuel limits relating to smoke production and fuel injection parameters, which may be applied nearly equally, or differently, to the two cylinder groups. At 314, an additional donor fuel limit is calculated that corresponds to delivering intake air oxygen concentration ($X_1$) above the intake air oxygen concentration lower limit ($X_{1LL}$).

The additional donor fuel limit may be referred to as a second fuel flow limit. The second fuel flow limit for the first, donor cylinder group may be based on a variety of parameters including the gas flow to the first cylinder group ($W_D$), fresh air flow to the intake manifold upstream of the EGR junction ($W_{FA}$), fresh air oxygen concentration ($X_{FA}$), intake air mass ($M_1$), EGR flow into intake ($W_{EGR}$), stoichiometric OFR (OFRs), and intake oxygen concentration lower limit ($X_{1ILL}$). The intake oxygen concentration lower limit is the lower limit of the target intake oxygen concentration, and may include a percentage of the set point (target) intake oxygen concentration. The intake oxygen concentration lower limit may be the intake oxygen concentration below which undesired emissions and/or combustion stability issues may occur. The intake oxygen concentration lower limit may be a suitable percentage of the target intake oxygen concentration, such as in a range from 96-99% of the target.

In one example, the second fuel flow limit (WdfUL) may be determined based on the following equation:

$$W_D f_{UL} = \frac{W_D [W_{FA}(X_{FA} - X_{1LL}) - \dot{X}_{1LL} \cdot M_1]}{W_{EGR}(OFRs + X_{1LL}) - [W_{FA}(X_{FA} - X_{1LL}) - \dot{X}_{1LL} \cdot M_1]}$$

As explained above, $W_D f_{UL}$ may be the second fuel flow limit, $W_D$ may be the gas flow to the donor cylinders (first cylinder group), $W_{FA}$ may be the fresh air flow into the intake manifold, $X_{FA}$ may be the oxygen concentration of the fresh air, $X_{1LL}$ may be the intake oxygen concentration lower limit (the lower limit of the set point intake oxygen concentration), $M_1$ may be the mass in the intake, $W_{EGR}$ may be the EGR flow into the intake, and OFRs may be the stoichiometric OFR. The above values may be directly measured via one or more sensors (such as the intake air mass flow, measured via a MAF sensor, for example) and/or estimated based on one or more measured parameters.

At 316, method 300 includes supplying fuel to the donor cylinders at a desired rate, up to but not more than the minimum of the typical donor fuel limit (e.g., the first fuel flow limit) and the additional limit for $X_{1LL}$ (e.g., the second fuel flow limit). As such, if the amount of fuel calculated at 310 is greater than the second fuel flow limit, the amount of fuel supplied to the first, donor cylinder group may be decreased to be below the second fuel flow limit. The second fuel flow limit may only apply to the first cylinder group, and thus the fuel that was not allowed in the first group of cylinder group may be redirected to the second cylinder group if below the first fuel flow limit.

Accordingly, at 318, method 300 determines if the donor fuel supplied to the donor cylinders is less than the amount of fuel desired to maintain engine torque. If yes, method 300 proceeds to 320 to add this fuel supply "miss" (e.g., the difference between the desired fuel amount and the delivered fuel amount for the donor cylinders) to the desired non-donor fuel supply, and then, at 322, supply the fuel to the non-donor cylinders in an amount up to but not more than the typical non-donor fuel limits. The extra fuel may be supplied to the second, non-donor cylinder group only if the second cylinder group is capable of receiving the extra fuel, e.g., the currently supplied amount of fuel to the second cylinder group is below the first fuel flow limit. If the desired fuel supply to the non-donor cylinders is at or near the first fuel flow limit (or any set fuel flow limit), the engine may bog and/or engine power may be derated.

If the donor fuel supplied is not less than the desired fuel, that is if the answer to the question at 318 is no, method 300 proceeds to 324 to maintain the desired non-donor fuel supply. Method 300 then proceeds to 322 to supply the fuel to the non-donor cylinders.

Thus, the methods of FIGS. 2-3 provide for detecting a change in requested EGR flow, for example in response to an increase in engine load. The EGR amount supplied to the intake may change in correspondence to the changing engine load. However, simply actuating the one or more exhaust valves may not provide a fast enough change in the EGR actually supplied to the intake, due to latencies in the EGR system. This may cause the intake oxygen concentration to drop below a lower limit threshold (also referred to as the intake oxygen concentration lower limit), where emissions may degrade and/or combustion stability issues may occur.

While the methods described herein may be performed responsive to a transient event, where the transient event is defined by a change in engine load, other types of transient events are possible. For example, the differential fuel control described above with respect to FIG. 3 may be performed in response to intake oxygen concentration being below a reference intake oxygen concentration by at least predetermined amount. The reference intake oxygen concentration may be the target intake oxygen concentration, and the predetermined amount may be the intake oxygen concentration lower limit, or may be an intake oxygen concentration that is above the lower limit (e.g., in order to prevent the intake oxygen concentration from ever reaching the lower limit, the method may be executed in response to the intake oxygen concentration decreasing below the target concentration, but before it reaches the lower limit). In one example, transient events may be virtually any instance where the primary control (exhaust valve control of EGR flow) is not sufficient in keeping the intake oxygen concentration from undershooting too much.

To prevent these intake oxygen concentration undershoots, the methods of FIGS. 2-3 adjust the fueling to the first cylinder group (e.g., the donor cylinders) to exhaust a higher oxygen concentration, and thus quickly lower the effective EGR rate to the intake and maintain the intake oxygen concentration above the oxygen concentration lower limit. The fuel amount supplied to the donor cylinders may be decreased so that the fuel supplied to the donor cylinders is maintained below a lower fuel supply limit. The fuel supply lower limit may be based on air flow dynamics of the intake (including mass air flow into the intake, air flow to the donor cylinders, EGR amount, and intake air oxygen concentration) as well as the intake oxygen concentration lower limit and the stoichiometric oxygen fuel ratio.

The fuel supplied to the donor cylinders and non-donor cylinders may be injected (via direct and/or port injection) and/or released via gas admission valves, and thus reducing the amount of fuel supplied to the donor cylinders may include reducing fuel injection amounts and/or reducing the amount of fuel supplied via the gas admission valves. In some examples, rather than simply reducing the amount of fuel supplied to the donor cylinders, the fuel injection pressure, duration, or other parameters may be adjusted additionally or alternatively. This may include increased or decreased fuel pressure for a static injection period, static pressure but variable injection times, and so on. Further, injection characteristics may be changed regardless of the amount (e.g., a short pulse plus balance, even pulses of fuel over the injection period, etc.). In other examples where both liquid and gaseous fuel are supplied to the engine, the amount of liquid fuel may be reduced and the amount of gaseous fuel increased or left constant. Thus, in systems where there are plural fuels and the fuel injection amount is changed, one fuel, the other fuel, or both fuel amounts may be changed.

In order to maintain requested engine torque, extra fuel may be supplied to the non-donor cylinders (the second cylinder group). For example, the amount of fuel that would typically be supplied to both the donor and non-donor cylinder groups to meet the torque request may be calculated, and then the second fuel flow limit for the donor cylinders may be determined. The difference between the original calculated fuel supply for the donor cylinders and the second fuel flow limit may be determined, and this difference may be added to the non-donor cylinders. If the non-donor cylinders are unable to accept extra fuel (e.g., if the non-donor cylinders are already being supplied fuel near a fuel flow upper limit), engine power may instead be decreased to avoid bogging the engine.

During the selective lowering of the fuel supply amount to the donor cylinders during a transient operating event, the one or more exhaust valves may be actuated to bring the EGR amount to the intake to the target EGR amount. Accordingly, the lowering of the fuel supply amount to the donor cylinders may be suspended once the EGR flow to the intake reaches the target EGR flow.

FIGS. 4-6 illustrate example engine operating parameters during a transient condition, including fuel flow to the donor and non-donor cylinders, fuel flow limits for both the donor and non-donor cylinders, and intake oxygen concentration. FIG. 4 illustrates the above parameters during operation without selective lowering of the fuel supply amount to the donor cylinders (e.g., where fueling to the donor and non-donor cylinders is controlled equally, such as when the methods of FIGS. 2-3 are not executed). FIGS. 5-6 illustrate the above parameters during operating with selective lowering of the fuel supply amount to the donor cylinders as described above with respect to the methods of FIGS. 2-3. FIG. 5 includes operation without additional fuel compensation to the non-donor cylinders, while FIG. 6 includes operation with additional fuel compensation to the non-donor cylinders.

Turning to FIG. 4, a plot 400 is illustrated showing fuel flow limits and fuel supply amounts for donor and non-donor cylinders and intake oxygen concentration during a transient engine operating condition. Prior to time t1, the engine may be operating under substantially steady state operating conditions, where engine toque load is constant. The intake oxygen concentration, illustrated by curve 410, may be maintained at a target intake oxygen concentration (illustrated by curve 411) and above the intake oxygen concentration lower limit (illustrated by curve 412) via the position of one or more EGR valves. The fuel supply to the non-donor cylinders (illustrated by curve 406) and the fuel supply to the donor cylinders (illustrated by curve 408) may be maintained at a relatively steady, equal amount. The fuel supplies may each be maintained below the same first fuel flow limit (illustrated by curves 402 and 404).

At time t1, the engine starts operating under a transient operating condition (e.g., an increase in throttle position causes engine torque load to increase). During the period of increasing load, the first fuel flow limits may increase as a result of increasing load acceptance capability resulting from increased engine speed and boost, and thus the first fuel flow limit may increase in correspondence to the resulting increase in capability, and both the fuel supply to the donor cylinders (curve 408) and the fuel supply to the non-donor cylinders (curve 406) increase to meet the torque load request. Also at time t1, the one or more exhaust valves may change position maintain the target EGR amount.

At time t2, due to the increased fuel supply amounts and latency in EGR system (due to a delay in the one or more exhaust valves actually changing position and/or due to the time for the exhaust already existing in the EGR system to be recirculated back to the intake), the intake oxygen concentration (curve 410) drops below the intake oxygen concentration lower limit (curve 412), until time t3, at which point the intake oxygen concentration increases back above the limit. The intake oxygen concentration may increase due to the EGR amount reaching the target EGR amount, for example.

FIG. 5 shows a plot 500 illustrating fuel flow limits and fuel supply amounts for donor and non-donor cylinders and intake oxygen concentration during a transient engine operating condition. Prior to time t1, the engine may be operating under substantially steady state operating conditions, where engine toque load is constant. The intake oxygen concentration, illustrated by curve 510, may be maintained at a target intake oxygen concentration (illustrated by curve 511) and above the intake oxygen concentration lower limit (illustrated by curve 512) via the position of one or more exhaust valves. The fuel supply to the non-donor cylinders (illustrated by curve 506) and the fuel supply to the donor cylinders (illustrated by curve 508) may be maintained at a relatively steady, equal amount. The fuel supplies may each be maintained below the same first fuel flow limit (illustrated by curves 502 and 504, where curve 502 is the fuel flow limit for the non-donor cylinders and curve 504 is the limit for the donor cylinders). While the curves 502 and 504 are shown as being different before time t1, it is to be understood that the separation between the curves is for clarity and that in some examples, the curves (and hence the fuel limits) may be substantially equal.

At time t1, the engine starts operating under a transient operating condition (e.g., an increase in throttle position causes engine torque load to increase). During the period of increasing load, the fuel flow limits for both the donor and non-donor cylinders may increase, as described above, and both the fuel supply to the donor cylinders (curve 508) and the fuel supply to the non-donor cylinders (curve 506) increase to meet the torque load request. Also at time t1, the one or more exhaust valves are change position to maintain the target EGR amount.

At time t2, the fuel flow limit for the donor cylinders, illustrated by curve 504, decreases to a second, lower fuel flow limit, in accordance with the method 300 described above. As a result, the amount of fuel supplied to the donor cylinders (curve 508) also decreases, relative to the amount of fuel supplied to the non-donor cylinders. By lowering the amount of fuel supplied to the donor cylinders, the intake oxygen concentration (illustrated by curve 510) is maintained above the concentration lower limit. At time t3, the fuel flow limit for the donor cylinders resumes the same fuel flow limit as the non-donor cylinders (due to the EGR amount reaching the target amount, from the one or more exhaust valves reaching their commanded position and/or other factors).

Also during time t2-t3, the amount of fuel supplied to the non-donor cylinders increases, although only by an amount initially calculated (e.g., no extra fuel is supplied to the non-donor cylinders responsive to the lowering of the fuel supplied to the donor cylinders).

FIG. 6 shows a plot 600 illustrating fuel flow limits and fuel supply amounts for donor and non-donor cylinders and intake oxygen concentration during a transient engine operating condition. Prior to time t1, the engine may be operating under substantially steady state operating conditions, where engine toque load is constant. The intake oxygen concentration, illustrated by curve 610, may be maintained at a target intake oxygen concentration (illustrated by curve 611) and above the intake oxygen concentration lower limit (illustrated by curve 612) via the position of one or more exhaust valves. The fuel supply to the non-donor cylinders (illustrated by curve 606) and the fuel supply to the donor cylinders (illustrated by curve 608) may be maintained at a relatively steady, equal amount. The fuel supplies may each be maintained below the same first fuel flow limit (illustrated by curves 602 and 604, where curve 602 is the fuel flow limit for the non-donor cylinders and curve 604 is the limit for the donor cylinders). While the curves 602 and 604 are shown as being slightly different before time t1, it is to be understood that the separation between the curves is illustrative and that in some examples, the curves (and hence the fuel limits) may be substantially equal.

At time t1, the engine starts operating under a transient operating condition (e.g., an increase in throttle position causes engine torque load to increase). During the period of increasing load, the fuel flow limits for both the donor and non-donor cylinders may increase as explained above, and both the fuel supply to the donor cylinders (curve 608) and the fuel supply to the non-donor cylinders (curve 606) increase to meet the torque load request. Also at time t1, the one or more exhaust valves may change position to maintain the target EGR amount.

At time t2, the fuel flow limit for the donor cylinders, illustrated by curve 604, decreases to a second, lower fuel flow limit, in accordance with the method 300 described above. As a result, the amount of fuel supplied to the donor cylinders (curve 608) also decreases, relative to the amount of fuel supplied to the non-donor cylinders. By lowering the amount of fuel supplied to the donor cylinders, the intake oxygen concentration (illustrated by curve 610) is maintained above the concentration lower limit. At time t3, the fuel flow limit for the donor cylinders resumes the same fuel flow limit as the non-donor cylinders (due to the EGR amount reaching the target amount, from the one or more exhaust valves reaching their commanded position and/or other factors).

Also during time t2-t3, the amount of fuel supplied to the non-donor cylinders increases with extra fuel supplied to the non-donor cylinders responsive to the lowering of the fuel supplied to the donor cylinders.

An embodiment relates to a system including an engine having a first cylinder group and a second cylinder group; an EGR passage coupled between the first cylinder group and an intake manifold, flow of EGR through the EGR passage controlled by one or more exhaust valves; an exhaust passage coupled to the second cylinder group; and a controller. The controller is configured maintain a target EGR flow by adjusting the one or more exhaust valves, where the target EGR flow is based on a target intake oxygen concentration. In this way, the exhaust valves are the primary mechanism of controlling to the intake oxygen concentration target. The controller is further configured to adjust an amount of fuel supplied to the first cylinder group to maintain intake oxygen concentration above an intake oxygen concentration lower limit. The fuel supply to the first cylinder group may be adjusted in order to be maintained below a donor fuel flow limit that is calculated based on intake flow parameters and the intake oxygen concentration lower limit. Thus, the donor fuel limit is a secondary mechanism of controlling to the intake oxygen concentration target, to ensure minimal undershoots if the primary mechanism of control is inadequate.

The secondary mechanism of control (donor fuel limit) ensures against intake oxygen concentration undershoots that can cause significant visible smoke during failure modes where the exhaust valves are not sufficiently responsive (stuck, slow, etc.).

In an embodiment, a system comprises an engine having a first cylinder group and a second cylinder group; an EGR passage coupled between the first cylinder group and an intake manifold, flow of EGR through the EGR passage controlled by one or more exhaust valves; an exhaust passage coupled to the second cylinder group; and a controller. The controller is configured to, during a first condition, maintain a target intake oxygen concentration by adjusting the EGR valve; and during a second condition, maintain intake oxygen concentration above a minimum concentration by reducing an amount of fuel injected into cylinders of the first cylinder group.

In an embodiment, a system comprises an engine, an exhaust gas recirculation (EGR) passage, an exhaust passage, and a controller. The engine has a first cylinder group and a second cylinder group. The EGR passage is coupled between the first cylinder group and an intake manifold. The exhaust passage is coupled to the second cylinder group. Flow of EGR through the EGR passage is controlled by one or more exhaust valves, e.g., the controller may be configured to control the one or more valves to vary the flow of EGR through the EGR passage, from no flow (or a minimum flow, if other than zero) to a maximum flow. The controller is configured to maintain a target intake oxygen concentration by adjusting the one or more exhaust valves and fuel injection amounts to the first cylinder group differently than the second cylinder group.

The controller is configured to adjust the one or more exhaust valves and fuel amounts to the first cylinder group differently than the second cylinder group responsive to a transient engine operation. In an example, the transient engine operation comprises a change in a throttle position. The target intake gas concentration is a target intake oxygen concentration, and the transient engine operation comprises an intake oxygen concentration being below a reference intake oxygen concentration by at least a predetermined amount.

When the intake oxygen concentration is not below the reference intake oxygen concentration by at least the predetermined amount, the controller is configured to maintain the target intake oxygen concentration by adjusting the one or more exhaust valves, and adjust fuel amounts to the first cylinder group similarly to the second cylinder group.

The controller is configured to adjust the fuel amounts to the first cylinder group differently than the second cylinder group by controlling decreased fuel amounts to the first cylinder group relative to fuel amounts to the second cylinder group. The target intake gas concentration is a target intake oxygen concentration, and the controller is configured to control decreased fuel amounts to the first cylinder group based on intake air flow to the first cylinder group, fresh air flow into the intake manifold, fresh air oxygen concentration, intake oxygen concentration lower limit, intake air mass, and intake EGR flow.

The one or more exhaust valves control an amount of the EGR from the first cylinder group through the EGR passage and back to the intake manifold, where the EGR passage is not coupled to the second cylinder group.

The target intake gas concentration is a target intake oxygen concentration, and the target intake oxygen concentration is based on one or more of engine speed, engine load, oxygen-fuel ratio, intake manifold air pressure, or exhaust emissions.

In an embodiment, a system comprises an engine, an exhaust gas recirculation (EGR) passage, an exhaust passage, and a controller. The engine has a first cylinder group and a second cylinder group. The EGR passage is coupled between the first cylinder group and an intake manifold. The exhaust passage is coupled to the second cylinder group. Flow of EGR through the EGR passage is controlled by one or more exhaust valves, e.g., the controller may be configured to control the one or more valves to vary the flow of EGR through the EGR passage, from no flow (or a minimum flow, if other than zero) to a maximum flow. The controller is configured, during a first condition, to control injection of fuel to cylinders of the first cylinder group and injection of fuel to cylinders of the second cylinder group to meet a load request (e.g., torque load request). Injection is controlled (by the controller during the first condition) such that the fuel injected to the cylinders of the first cylinder group and the fuel injected to the cylinders of the second cylinder group are each maintained below the same first fuel flow limit. The controller is further configured, during a second condition, to control injection of fuel to the cylinders of the first cylinder group to maintain an intake oxygen concentration lower limit, and injection of fuel to the cylinders of the second cylinder group to maintain engine load (e.g., engine torque load). As controlled by the controller during the second condition, the fuel injected to the cylinders of the first cylinder group is maintained below a second, lower fuel flow limit and the fuel injected to the cylinders of the second cylinder group is maintained below the first fuel flow limit.

The controller is configured to, if the first amount of fuel is not above the donor fuel flow limit, inject fuel to the first and second cylinder groups to meet the torque load request, and adjust the one or more exhaust valves to maintain a target intake oxygen concentration, the fuel injected to the first cylinder group and the fuel injected to the second cylinder group maintained below a static fuel flow limit.

The portion of the first amount of fuel is selected to maintain fuel injection to the cylinders of the first cylinder group below the donor fuel flow limit. The controller is configured to inject a remaining portion of the first amount of fuel to the cylinders of the second cylinder group. The controller is configured to adjust the one or more exhaust valves to reach a target intake oxygen concentration.

In embodiments, an engine has a first cylinder group and a second cylinder group. Each cylinder group may comprise at least one cylinder of the engine. The cylinders of the first cylinder group and the cylinders of the second cylinder group may be separate and distinct from one another, meaning no cylinders of the first group are included in the second group and no cylinders of the second group are included in the first group.

In an embodiment, a method comprises, during a first condition, injecting fuel to cylinders of a first cylinder group of an engine and injecting fuel to cylinders of a second cylinder group of the engine to meet a torque load request, the fuel injected to the cylinders of the first cylinder group and the fuel injected to the cylinders of the second cylinder group each maintained below the same first fuel flow limit; and during a second condition, injecting fuel to the cylinders of the first cylinder group to maintain an intake oxygen concentration lower limit, and injecting fuel to the cylinders of the second cylinder group to maintain engine torque load, the fuel injected to the cylinders of the first cylinder group maintained below a second, lower fuel flow limit and the fuel injected to the cylinders of the second cylinder group maintained below the first fuel flow limit.

The method further comprises, during both the first condition and the second condition, directing exhaust gas from the first cylinder group to an exhaust gas recirculation (EGR) passage fluidly coupled between the first cylinder group and an intake manifold, and directing exhaust gas from the second cylinder group to an exhaust passage and not to the EGR passage. The method further comprises determining the second fuel flow limit based on intake air flow to the cylinders of the first cylinder group, fresh air flow into an intake manifold, fresh air oxygen concentration, the intake oxygen concentration lower limit, intake air mass, and intake EGR flow.

In an example, the first condition comprises steady state operating conditions, and wherein the second condition comprises transient operating conditions. Maintaining fuel injected to the cylinders of the first cylinder group below the second, lower fuel flow limit and maintaining fuel injected to the cylinders of the second cylinder group below the first fuel flow limit further comprises, if an amount of fuel injected to the cylinders of the second cylinder group during the second condition is less than the first fuel flow limit, transferring fuel scheduled to be injected to the cylinders of the first cylinder group to the cylinders of the second cylinder group to maintain engine torque.

Maintaining fuel injected to the cylinders of the first cylinder group below the second, lower fuel flow limit and maintaining fuel injected to the cylinders of the second cylinder group below the first fuel flow limit further comprises, if an amount of fuel injected to the cylinders of the second cylinder group during the second condition is equal to the first fuel flow limit, de-rating engine power.

An embodiment for a controller is provided. The controller is configured to maintain a target intake oxygen concentration by adjusting one or more exhaust gas recirculation (EGR) valves and fuel injection amounts to a first cylinder group of an engine differently than a second cylinder group of the engine.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
an engine having first and second cylinder groups, and an exhaust gas recirculation (EGR) passage coupled between the first cylinder group and an intake manifold of the engine, flow of EGR through the EGR passage controlled by one or more exhaust valves;
a controller configured to maintain a target intake gas concentration by adjusting the one or more exhaust valves and adjusting fuel amounts to the first cylinder group differently than the second cylinder group;

wherein the controller is configured to adjust the one or more exhaust valves and fuel amounts to the first cylinder group differently than the second cylinder group responsive to a detected transient engine operation; and wherein the target intake gas concentration is a target intake oxygen concentration, and wherein the transient engine operation comprises an intake oxygen concentration being below a reference intake oxygen concentration by at least a predetermined amount.

2. The system of claim 1, wherein the transient engine operation comprises a change in a throttle position.

3. The system of claim 1, wherein when the intake oxygen concentration is not below the reference intake oxygen concentration by at least the predetermined amount, the controller is configured to:

maintain the target intake oxygen concentration by adjusting the one or more exhaust valves, and adjust fuel amounts to the first cylinder group similarly to the second cylinder group.

4. The system of claim 1, wherein the controller is configured to adjust the fuel amounts to the first cylinder group differently than the second cylinder group by controlling decreased fuel amounts to the first cylinder group relative to fuel amounts to the second cylinder group.

5. The system of claim 4, wherein the controller is configured to control decreased fuel amounts to the first cylinder group based on a detected intake air flow to the first cylinder group, fresh air flow into the intake manifold, fresh air oxygen concentration, intake oxygen concentration lower limit, intake air mass, and intake EGR flow.

6. The system of claim 1, wherein the one or more exhaust valves control an amount of the EGR from the first cylinder group through the EGR passage and back to the intake manifold, the EGR passage not coupled to the second cylinder group.

7. The system of claim 1, wherein the target intake oxygen concentration is based on a detected one or more of engine speed, engine load, oxygen-fuel ratio, intake manifold air pressure, or exhaust emissions.

8. A system comprising:

an engine having a first cylinder group and a second cylinder group;

an exhaust gas recirculation (EGR) passage coupled between the first cylinder group and an intake manifold, flow of EGR through the EGR passage controlled by one or more exhaust valves;

an exhaust passage coupled to the second cylinder group; and a controller configured to:

determine a first amount of fuel to inject to cylinders of the first cylinder group and a second amount of fuel to inject to cylinders of the second cylinder group to meet a torque load request, if the first amount of fuel is above a donor fuel flow limit for maintaining intake oxygen concentration above a lower limit, maintain the intake oxygen concentration above the lower limit by only injecting a portion of the first amount of fuel to the cylinders of the first cylinder group;

wherein the controller is configured to, if the first amount of fuel is not above the donor fuel flow limit, inject fuel to the first and second cylinder groups to meet the torque load request, and adjust the one or more exhaust valves to maintain a target intake oxygen concentration, the fuel injected to the first cylinder group and the fuel injected to the second cylinder group maintained below a static fuel flow limit; and wherein the controller is configured to adjust the one or more exhaust valves to reach a target intake oxygen concentration.

9. The system of claim 8, wherein the portion of the first amount of fuel is selected to maintain fuel injection to the cylinders of the first cylinder group below the donor fuel flow limit.

10. The system of claim 8, wherein the controller is configured to inject a remaining portion of the first amount of fuel to the cylinders of the second cylinder group.

11. A method, comprising:

during a first condition, injecting fuel to cylinders of a first cylinder group of an engine and injecting fuel to cylinders of a second cylinder group of the engine to meet a detected torque load request, the fuel injected to the cylinders of the first cylinder group and the fuel injected to the cylinders of the second cylinder group each maintained below the same first fuel flow limit;

during a second condition, injecting fuel to the cylinders of the first cylinder group to maintain an intake oxygen concentration lower limit, and injecting fuel to the cylinders of the second cylinder group to maintain engine torque load, the fuel injected to the cylinders of the first cylinder group maintained below a second, lower fuel flow limit and the fuel injected to the cylinders of the second cylinder group maintained below the first fuel flow limit;

during both the first condition and the second condition, directing exhaust gas from the first cylinder group to an exhaust gas recirculation (EGR) passage fluidly coupled between the first cylinder group and an intake manifold, and directing exhaust gas from the second cylinder group to an exhaust passage and not to the EGR passage; and determining the second fuel flow limit based on intake air flow to the cylinders of the first cylinder group, fresh air flow into an intake manifold, fresh air oxygen concentration, the intake oxygen concentration lower limit, intake air mass, and intake EGR flow.

12. The method of claim 11, wherein the first condition comprises steady state operating conditions, and wherein the second condition comprises transient operating conditions.

13. The method of claim 11, wherein maintaining fuel injected to the cylinders of the first cylinder group below the second, lower fuel flow limit and maintaining fuel injected to the cylinders of the second cylinder group below the first fuel flow limit further comprises, if an amount of fuel injected to the cylinders of the second cylinder group during the second condition is less than the first fuel flow limit, transferring fuel scheduled to be injected to the cylinders of the first cylinder group to the cylinders of the second cylinder group to maintain engine torque.

14. The method of claim 11, wherein maintaining fuel injected to the cylinders of the first cylinder group below the second, lower fuel flow limit and maintaining fuel injected to the cylinders of the second cylinder group below the first fuel flow limit further comprises, if an amount of fuel injected to the cylinders of the second cylinder group during the second condition is equal to the first fuel flow limit, derating engine power.

15. A system comprising an engine having first and second cylinder groups, and an exhaust gas recirculation (EGR) passage coupled between the first cylinder group and an intake manifold of the engine, flow of EGR through the EGR passage controlled by one or more exhaust valves; and a controller configured to maintain a target intake oxygen concentration by adjusting the one or more exhaust valves and adjusting fuel amounts to the first cylinder group differently than the second cylinder group responsive to a detected intake oxygen concentration being below a reference intake oxygen concentration by at least a predetermined amount during a transient engine operation.

16. The system of claim 15, wherein the transient engine operation comprises a change in a throttle position.

17. The system of claim 16, wherein when the intake oxygen concentration is not below the reference intake oxygen concentration by at least the predetermined amount, the controller is configured to:

maintain the target intake oxygen concentration by adjusting the one or more exhaust valves, and adjust fuel amounts to the first cylinder group similarly to the second cylinder group.

18. The system of claim 15, wherein the controller is configured to adjust the fuel amounts to the first cylinder group differently than the second cylinder group by controlling decreased fuel amounts to the first cylinder group relative to fuel amounts to the second cylinder group.

19. The system of claim 18, wherein the controller is configured to control decreased fuel amounts to the first cylinder group based on a detected intake air flow to the first cylinder group, fresh air flow into the intake manifold, fresh air oxygen concentration, intake oxygen concentration lower limit, intake air mass, and intake EGR flow.

20. The system of claim 15, wherein the one or more exhaust valves control an amount of the EGR from the first cylinder group through the EGR passage and back to the intake manifold, the EGR passage not coupled to the second cylinder group.

21. The system of claim 15, wherein the target intake oxygen concentration is based on a detected one or more of engine speed, engine load, oxygen-fuel ratio, intake manifold air pressure, or exhaust emissions.

* * * * *